3,318,950
PROCESS FOR PREPARING CARBOXYLIC
ACID CHLORIDES
Frank J. Christoph, Jr., Elkton, Md., Stuart H. Parker, Wilmington, Del., and Robert L. Seagraves, Pennsville, N.J., assignors to E. I. du Pont de Nemours and Company, Wilmington, Del., a corporation of Delaware
No Drawing. Filed Dec. 10, 1963, Ser. No. 329,387
7 Claims. (Cl. 260—544)

The present invention is directed to a novel process for the preparation of carboxylic acid chlorides. More particularly, the present invention is directed to a novel process involving the catalyzed reaction of intermolecular anhydrides of carboxylic acids with phosgene under particular reaction conditions.

In recent years carboxylic acid chlorides, such as the chlorides of iso and terephthalic acids, have become very important chemicals, since they are used commercially for the synthesis of newly developed fibers and as intermediates in the pigment, pharmaceutical, adhesive and rubber industries.

It is well known that carboxylic acid chlorides are obtained by the reaction of carboxylic acids with phosgene, as illustrated by the equation $$RCOOH + COCl_2 \rightarrow RCOCl + HCl + CO_2$$

This reaction is catalyzed by a formamide derivative. As illustrated in the equation, half of the chlorine content of the phosgene is converted to HCl, a by-product of the reaction. This by-product HCl evolves from the reaction as a mixture with $CO_2$. Recovery of the by-poduct HCl from such a mixture is difficult and uneconomical. This results in an overall loss of half the available chlorine. It is possible in this process for forming carboxylic acid chlorides to use thionyl chloride in place of phosgene. However, here again part of the chlorine is lost since the same difficulty is encountered in recovering the by-product HCl.

It has now been found that excellent yields of carboxylic acid chlorides are produced when intermolecular anhydrides of carboxylic acids are reacted with phosgene under specific reaction conditions. It has also been found that this novel process has the advantage that the available chlorine in the starting materials is fully utilized. This novel reaction is illustrated by the equation:

$$R-CO-O-CO-R + COCl_2 \rightarrow 2RCOCl + CO_2$$

Various methods for the preparation of carboxylic acid chlorides by the reaction of the acid anhydride with thionyl chloride are described in the art (see U.S. Patents 1,819,613 and 1,951,364). These methods disclose that both intramolecular anhydrides, e.g., o-phthalic anhydride, and intermolecular anhydrides, e.g., acetic anhydride, react readily with thionyl chloride to form carboxylic acid chlorides. This process for preparing carboxylic acid chlorides is uneconomical, since thionyl chloride is a relatively expensive reagent to use in large-scale commercial production. Thus, due to the increasing demand for carboxylic acid chlorides in the last few years, the need for an efficient and economical process for their production has been steadily increasing.

Although in some reactions phosgene may be substituted for thionyl chloride as a halogenating agent, phosgene is less reactive than thionyl chloride and therefore its reaction with various compounds cannot be predicted on the basis of the reactivity of thinoyl chloride. It has now been established that phosgene also reacts with carboxylic acid anhydrides, but only with intermolecular or open chain anhydrides in the presence of a catalyst to form carboxylic acid chlorides. Thus, in contrast to the available are processes, it is now possible to prepare many carboxylic acid chlorides by the present process which uses the inexpensive phosgene, and, at the same time, forms the carboxylic acid chlorides without the undersirable formation of HCl mixed with $CO_2$.

A further advantage inherent in the process of preparing carboxylic acid chlorides by the reaction of phosgene with intermolecular carboxylic acid anhydrides is the convenience of handling phosgene, a gas, to handling thionyl chloride which is a liquid. This becomes especially important when the process is conducted on a continuous basis, since it is much more desriable to feed in a gas which effects a more thorough and rapid contact between the reactants.

It is, therefore, the object of this invention to provide a novel process for the preparation of carboxylic acid chlorides in an efficient and economical manner.

It is another object of this invention to provide a novel continuous process for the preparation of carboxylic acid chlorides.

These and other objects will become apparent from the following description and claims.

More specifically, the present invention is directed to a process for the preparation of carboxylic acid chlorides which comprises reacting intermolecular anhydrides of caboxylic acids with phosgene at 40°–150° C. in the presence of a carboxamide of the formula:

(1)

$$R-CO-NR_1R_2$$

where R is hydrogen or lower alkyl, and $R_1$ and $R_2$ are lower alkyl or phenyl and may be alike or different.
or (2)

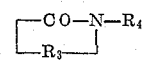

where $R_3$ is an alkylene radical of 2 to 5 carbon atoms and $R_4$ is an alkyl radical of 1 to 4 carbon atoms.

The present invention is also directed to the above process conducted in a continuous manner.

The anhydrides which are the starting materials in the novel process of the present invention are intermolecular, that is, anhydrides having the anhydride oxygen atom as part of an open chain. Two molecules of the acid are required to form the intermolecular anhydride of a monocarboxylic acid, three for the intermolecular anhydride of a dicarboxylic acid, etc. The intermolecular anhydrides are distinguished from intramolecualr anhydrides, wherein the anhydride oxygen forms a cyclic structure. Examples of intramolecular anhydrides are phthalic and succinic anhydrides.

The formation of carboxylic acid chlorides according to the present invention may be specifically illustrated by the following reaction equations which show the formation of isophthaloyl chloride by using isophthalic acid:

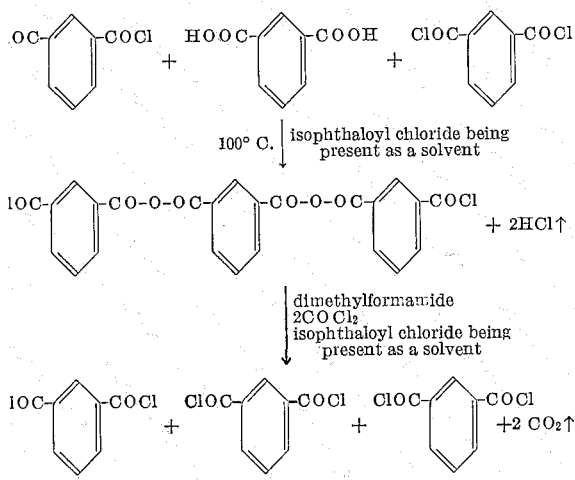

As illustrated above, one of the important advantages of the process of the present invention is that the liberated HCl is free from $CO_2$ and unreacted phosgene and, therefore, can be economically recovered. At the temperature at which the anhydride is formed, the solubility of HCl is low and most of it will be evolved before the phosgene and catalyst are added. Another advantage of the present process is that the anhydride is soluble in the chloride, provided the molecular weight of the anhydride is kept low. In the prior art process for converting the carboxylic acid directly to the acid chloride in the presence of dimethylformamide catalyst, the acid is a solid suspended in the reaction liquid and, therefore, the phosgenation step is a gas/liquid/solid reaction. Since in the present invention the anhydride is soluble in the chloride, the phosgenation reaction is a gas/liquid reaction. There are two advantages obtained in using a gas/liquid reaction instead of the prior art gas/liquid/solid reaction. First, there is greater convenience in handling a gas/liquid reaction. Secondly, faster reaction rates are obtained with the dissolved anhydride of the gas/liquid reaction in comparison to the suspended isophthalic acid in the gas/liquid/solid reaction.

Representative of the organic anhydrides which find application as starting materials in the present invention are those formed from the following groups of acids. The first group includes those anhydrides formed from aliphatic monocarboxylic acids of 2 to 18 carbon atoms, such as acetic, propionic, butyric, caproic, pelargonic, lauric, myristic, palmitic and stearic. A second group includes those anhydrides formed from the aliphatic dicarboxylic acids of 3 to 18 carbon atoms, such as malonic, glutaric, adipic, pimelic, azelaic, up to and including octadecandioic acid. A third group includes those anhydrides formed from substituted aryl mono- and dicarboxylic acids, such as benzoic, p-nitrobenzoic, toluic, p-anisic, o-methoxybenzoic, isophthalic, terephthalic, 5-chlorisophthalic, and naphthoic. A fourth group includes those anhydrides formed from cyclic aliphatic acids such as cyclohexane-1,4-dicarboxylic and cyclopentane-1,3-dicarboxylic. The final group includes mixed anhydrides of any two acids from the above-mentioned groups of acids.

The carboxamide compounds useful as catalysts in the practice of this invention are of the formula (1)   R—CO—NR₁R₂ where R is hydrogen or lower alkyl, and $R_1$ and $R_2$ are lower alkyl or phenyl and may be alike or different, or (2) 

where $R_3$ is an alkylene radical of 2 to 5 carbon atoms and $R_4$ is an alkyl radical of 1 to 4 carbon atoms.

Representative examples of carboxamides which are useful as catalysts in the present invention are N,N-dimethylformamide, N,N-dimethylacetamide, N,N-di-n-propylacetamide, N,N-diisopropylacetamide, N,N-dibutylformamide, N,N-diethylpropionamide, N,N-dimethylbutyramide, N-methylformanilide, N-methylacetanilide, N,β-dimethylpropiolactam, N-ethyl-β-methylpropiolactam, N-methyl-2-pyrrolidone, N-isopropyl-2-pyrrolidone, 1,5-dimethyl-2-pyrrolidone, 1,3,3,5-tetramethyl-2-pyrrolidone, N-methyl-2-piperidone, and N-methyl-ε-caprolactam.

The amount of carboxamide catalyst can be varied within wide limits in the range of 0.05 to 10.0 weight percent based on the anhydride. The preferred amount of carboxamide catalyst is in the range from 1.0 to 3.0 weight percent based on the anhydride.

The process may be carried out batchwise or in a continuous manner. The procedure for the batch process consists in introducing the anhydride and catalyst into a reaction vessel equipped with agitator, thermometer, phosgene inlet tube and outlet tube. The anhydride and catalyst mixture is then heated with agitation to a temperature of 40° to 150° C. depending upon the boiling points of the starting materials and the product. Phosgene is introduced into the mixture with continued agitation at approximately the same rate at which it reacts. The carboxylic acid chloride products, where they boil below the reaction temperature, are recovered by allowing them to distill off as they are formed, as for example, in the case of acetyl chloride. The carboxylic acid chlorides are recovered from the reaction mass by distillation in the case where the carboxylic acid chlorides boil above the reaction temperature.

In carrying out the process, the molten carboxylic acid anhydride itself may serve as the sole reaction solvent. However, inert solvents can be employed as reaction solvents provided that these inert solvents do not contain groups which react with the carboxylic acid chlorides, are miscible with the carboxylic acid chloride and carboxamide catalyst, and have physical properties, such as boiling points, which are sufficiently different from those of the carboxylic acid chloride to permit ready separation of the acid chloride from the solvent by physical means. Representative inert solvents which can be used as reaction solvents in the present invention include aliphatic hydrocarbons, such as hexane or heptane, and aromatic hydrocarbons, such as xylene and mono- and dichlorobenzene. The use of these solvents, however, decreases the production capacity of the product per reactor equipment and entails the collection of an extra distillation cut.

As stated before, the temperature can be varied within the range of 40° to 150° C. The preferred temperature is 60° to 100° C. Below 40° C., the reaction rate becomes inconveniently slow. The upper temperature limit is determined by the physical properties of the solvent. Generally above 150° C., the vapor pressure of most applicable solvents would be too high to carry out the reaction in the liquid phase without external pressure. However, the process may be conducted at a higher temperature in a suitable solvent; an example of which is o-dichlorobenzene which has a boiling point of 180° C.

The amount of reactants necessary for completion of the reaction is at least one mole phosgene per anhydride link in the case of anhydrides of monocarboxylic acids. Similarly for anhydrides of polycarboxylic acids, where the anhydride is formed by the preferred process of heating the polycarboxylic acid in an excess of the acid chloride at conditions that eliminate the carboxylic acid groups, one mole of phosgene is required for each anhydride link. However, for anhydrides prepared directly from the polycarboxylic acids, one mole of phosgene is necessary for each anhydride link as well as one mole for each carboxylic acid group, for example

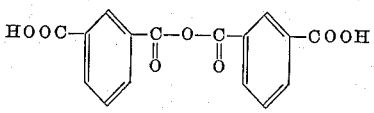

requires 3 moles of COCl$_2$. Preferably an excess of phosgene is desired. The amount of excess is dependent upon the reaction conditions being used, such as, temperature, rate of phosgene addition, catalyst concentration and volume solvent. More than 20% excess of phosgene would be wasteful.

The process may also be carried out in a continuous manner by first charging the reaction vessel with anhydride and catalyst. Phosgene and additional anhydride are fed continuously into the reaction vessel. The acid chloride product distills over and is subsequently redistilled.

The following examples are representative and illustrative of the present invention. All parts are by weight unless specified otherwise.

EXAMPLE I
Conversion of acetic anhydride to acetyl chloride

Two hundred and four parts of acetic anhydride and 5 parts of dimethylformamide were added to a 500 ml. round-bottom, 4-necked flask fitted with stirrer, thermometer, phosgene inlet tube and a 12 inch Vigreux column which, in turn, was connected to a condenser and an ice-cooled 250 ml. receiver.

The mixture was heated to 95° C. and 168 parts of phosgene were added over a 2 hour period with stirring. The acetyl chloride was allowed to distill off as it formed and 241 parts were collected in the receiver.

The product was redistilled and 232 parts of acetyl chloride, having a boiling point of 51° C., were obtained. The yield was 74% of theory and the product purity was 99% as determined by hydrolyzable chlorine analysis.

Substantially the same yield of acetyl chloride is obtained if in the above example 6 parts of dimethylacetamide are substituted for the 5 parts of dimethylformamide.

EXAMPLE II
Conversion of acetic anhydride to acetyl chloride

An apparatus similar to that of Example I was used except that a 1 liter flask and a 500 ml. receiver were used and a pressure-equalized dropping funnel was connected to the 1 liter flask.

Two hundred and four parts of acetic anhydride and 3 parts of dimethylforamide were added to the flask. The mixture was heated to 110° C. and 116 parts of phosgene were added with stirring over approximately 1½ hours. During this time 102 parts of acetic anhydride were added dropwise to the reaction flask at a rate approximating that at which the distillate collected in the receiver. The collected distillate amounted to 141.2 parts and had a boiling range of 84–85° C.

The distillate, when redistilled through a 2 foot Vigreux column, gave 107.2 parts of acetyl chloride, boiling range 48.5–50.5° C., and 29 parts of a residue assumed to be acetic anhydride.

The residue in the reaction flask was distilled giving 177.6 parts of acetic anhydride, boiling range 138–141° C. The yield of acetyl chloride was 71% based on the acetic anhydride consumed.

If in the above example 5.2 parts of N-methyl-ε-caprolactam are substituted for the 3 parts of dimethylformamide, substantially the same results are obtained.

EXAMPLE III
Conversion of acetic anhydride to acetyl chloride

An appartus similar to that of Example I was used except that a 1 liter flask and a 500 ml. receiver were used.

One hundred and two parts of acetic anhydride, 3 parts of dimethylforamide, and 520 parts of o-dichlorobenzene were added to the flask. The mixture was heated to 95° C. and held at 95±5° C. with stirring while 121 parts of phosgene were added over approximately a 2 hour period. At the end of the period, product distillation ceased and, on stopping the stirrer, a black heavy oil layer separated out in the reaction flask.

The upper layer containing 77.2 parts of product was separated from the black heavy oil layer. The upper layer, on redistillation through a 12 inch Vigreux column, gave 69.4 parts of acetyl chloride with a boiling range of from 49–51° C.

EXAMPLE IV
Conversion of n-butyric anhydride to n-butyric chloride

One hundred parts of n-butyric anhydride and 3 parts of dimethylformamide were added to a 500 ml. round-bottom 4-necked flask fitted with stirrer, thermometer, phosgene inlet tube and reflux condenser.

The mixture was heated to 85° C. and held at approximately 85° C. with stirring while 102 parts of phosgene were added at a rate of about 60 parts/hour. An oily layer settled out. This was removed and the reaction mass was then distilled through a 12 inch Vigreux column.

After distillation, 40.5 parts of n-butyric chloride were obtained with a purity of 99.3% based on hydrolyzable chlorine analysis. The yield was 30%.

EXAMPLE V
Conversion of iso-butyric anhydride to iso-butyric chloride

An apparatus similar to that of Example IV was used to carry out the reaction.

One hundred parts of iso-butyric anhydride and 3 parts of dimethylformamide were added to the flask and heated to 85° C. The temperature was held at approximately 85° C. with stirring while 102 parts of phosgene were added over a 2 hour period.

An oily catalyst layer settled out. This was removed and the reaction mass was then distilled through a 12 inch Vigreux column.

After distillation 173 parts of distillate were obtained with a boiling range of 84–86° C. The distillate, contained 53.9% iso-butyric chloride as determined by hydrolyzable chlorine analysis.

EXAMPLE VI
Conversion of benzoic anhydride to benzoyl chloride

An apparatus similar to that of Example IV was used to carry out the reaction.

One hundred parts of benzoic anhydride, 2 parts of dimethylformamide and 264 parts of n-hexane were added to the flask and heated to 60° C. The temperature was held at approximately 60° C. with stirring while 170 parts of phosgene were added over 7 hours.

The n-hexane was removed by means of a water aspirator and the residue was distilled at reduced pressure. The main distillation fraction (54 parts) was impure benzoyl chloride. It boiled at 89° C./3 mm., 181–186° C./760 mm. and gave an anilide melting at 155–160.5° C.

EXAMPLE VII
Conversion of isophthalic anhydride(s) to isophthaloyl chloride An apparatus similar to that of Example IV was used to carry out the reaction.

One hundred parts of isophthalic acid and 500 parts of isophthaloyl chloride (freezing point 43.70° C.) were added to the flask and heated to 150° C. The slurry was held at 150±5° C. with stirring for 45 minutes. At the end of this period all of the isophthalic acid had been converted to anhydride by reaction with the isophthaloyl chloride, and the reaction mass consisted of a homogeneous solution of isophthalic anhydride dissolved in isophthaloyl chloride.

The mass was cooled to 95° C. and 4 parts of dimethylformamide were added. The mass was then held at 5±5° C. with stirring while 159 parts of phosgene were added at a rate of approximately 60 parts/hour.

After all the phosgene had been added, 644.8 parts of crude reaction mass were obtained. Two hundred parts of the mass were distilled at 10 mm. pressure through a 2 inch Vigreux column. The distillation foreshot, main cut, and residue yielded, respectively 19.4 parts, 165.2 parts, and 9.7 parts. The weight loss of 5.7 parts is ascribed to gas dissolved in the crude reaction mass.

The distillation main cut (isophthaloyl chloride), had a freezing point of 43.67° C.

When 5.3 parts of N-methyl-2-pyrrolidone are substituted for the 4 parts of dimethylformamide, substantially the same yield of isophthaloyl chloride is obtained.

EXAMPLE VIII

*Attempted conversion of succinic anhydride to succinic chloride*

An apparatus similar to that of Example IV was used to carry out the reaction.

Fifty parts of succinic anhydride, 1.5 parts of dimethylformamide and 68.4 parts of n-heptane were added to the flask and heated to 85° C. The temperature was held at approximately 85° C. with stirring while 85 parts of phosgene were added over about 1½ hours. The reaction mass was then distilled through a 12 inch Vigreux column.

After removing the heptane, 6 parts of a fraction boiling at 165° C. and 44 parts of a hard, black, solid distillation residue were obtained. The 165° C. fraction consisted of 96% succinic chloride as determined by hydrolyzable chlorine analysis. It represented a yield of only 7% based on the anhydride.

The above result illustrates the fact that intramolecular anhydrides, such as succinic anhydride, are not operable in the present process.

EXAMPLE IX

*Attempted conversion of phthalic anhydride to phthaloyl chloride*

An apparatus similar to that of Example IV was used to carry out the reaction.

One hundred parts of phthalic anhydride, 2 parts of dimethylformamide and 263.5 parts of n-hexane were added to the flask and heated to 60° C. The temperature was held at approximately 60° C. with stirring while 185 parts of phosgene were added over 5 hours. The reaction mass was filtered and the solid was washed with n-hexane and dried. The solid consisted of 100.7 parts of unreacted phthalic anhydride.

This result, similar to that of Example VIII, verifies the fact that intramolecular anhydrides, such as phthalic anhydride, are not operable according to the present process to form carboxylic acid chlorides.

It is understood that the preceding examples are representative and that said examples may be varied within the total specification, as understood by one skilled in the art, to produce essentially the same result.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

We claim:

1. A process for preparing carboxylic acid chlorides which comprises reacting an intermolecular anhydride of carboxylic acids with phosgene at a temperature from about 40° C. to about 150° C. in the presence of a carboxamide having a structure selected from the group consisting of (A) R—CO—NR$_1$R$_2$, where R is selected from the group consisting of hydrogen and lower alkyl, and R$_1$ and R$_2$ are each individually selected from the group consisting of lower alkyl and phenyl, and (B)
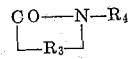

where R$_3$ is an alkylene radical of 2 to 5 carbon atoms and R$_4$ is an alkyl radical of 1 to 4 carbon atoms, said intermolecular anhydride being free of substituents which react with phosgene; and recovering from the reaction mixture the corresponding acid chloride of said carboxylic acid.

2. A process for preparing a carboxylic acid chloride which comprises reacting an intermolecular anhydride of a carboxylic acid with phosgene at a temperature from about 40° C. to 150° C. in the presence of a carboxamide having a structure selected from the group consisting of (A) R—CO—NR$_1$R$_2$, where R is selected from the group consisting of hydrogen and lower alkyl, and R$_1$ and R$_2$ are each individually selected from the group consisting of lower alkyl and phenyl, and (B)
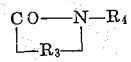

wherein R$_3$ is an alkylene radical of 2 to 5 carbon atoms and R$_4$ is an alkyl radical of 1 to 4 carbon atoms, said intermolecular anhydride being formed from carboxylic acids selected from the group consisting of (1) C$_2$ to C$_{18}$ aliphatic monocarboxylic acids, (2) C$_3$ to C$_{18}$ aliphatic dicarboxylic acids, (3) aryl mono- and dicarboxylic acids having from 6 to 12 carbon atoms, (4) substituted aryl mono- and dicarboxylic acids having from 6 to 12 carbon atoms, said substituents being nitro, chloro, methoxy, and methyl, and (5) cyclic aliphatic dicarboxylic acids having 7 to 8 carbon atoms; and recovering from the reaction mixture the corresponding acid chloride of said carboxylic acid.

3. A process for preparing isophthaloyl chloride which comprises reacting the intermolecular anhydride of isophthalic acid with phosgene at a temperature from about 40° C. to about 150° C. in the presence of dimethylformamide, and recovering isophthaloyl chloride from the reaction mixture.

4. A process for preparing isophthaloyl chloride which comprises heating to above 100° C. one mole of isophthalic acid in the presence of at least 2 moles of isophthaloyl chloride, removing the HCl gas evolved from the reaction mass, and then, after all the HCl gas has evolved, adding dimethylformamide to the reaction mass and passing at least 2 moles of phosgene through the reaction medium at from about 40 to 150° C., and thereafter recovering about 3 moles of isophthaloyl chloride from the reaction medium.

5. A process for preparing acetyl chloride which comprises reacting the intermolecular anhydride of acetic acid with phosgene at a temperature from about 40° C. to about 150° C. in the presence of dimethylformamide, and recovering acetyl chloride from the reaction medium.

6. A continuous process for preparing carboxylic acid chlorides which comprises continuously reacting an intermolecular anhydride of carboxylic acids with phosgene at a temperature from about 40° C. to about 150° C. in the presence of a carboxamide having a structure selected from the group consisting of (A) R—CO—NR$_1$R$_2$, wherein R is selected from the group consisting of hydrogen and lower alkyl, and R$_1$ and R$_2$ are each individually selected from the group consisting of lower alkyl and phenyl, and (B)
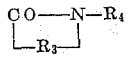

where $R_3$ is an alkylene radical of 2 to 5 carbon atoms and $R_4$ is an alkyl radical of 1 to 4 carbon atoms, said intermolecular anhydride being free of substituents which react with phosgene; and continuously recovering from the reaction mixture the corresponding acid chloride of said carboxylic acid.

7. A continuous process for preparing acetyl chloride which comprises continuously reacting the intermolecular anhydride of acetic acid with phosgene at a temperature from about 40° C. to about 150° C. in the presence of dimethylformamide, and continuously recovering acetyl chloride from the reaction medium.

References Cited by the Examiner

UNITED STATES PATENTS 2,657,233  10/1953  Carnahan _____ 260—544
3,184,506  5/1965  Parker et al. _____ 260—544

FOREIGN PATENTS 785,075  5/1935  France.

OTHER REFERENCES

Eilingsfeld et al., "Angewandte Chemie" vol. 72, (1960) pp. 836–845 (p. 837 relied on).

LORRAINE A. WEINBERGER, *Primary Examiner.*

RICHARD K. JACKSON, *Examiner.*